E. J. MORGAN.
MILLSTONE DRESS.

No. 186,150. Patented Jan. 9, 1877.

Witnesses
Fred G. Dietrich
N. L. Allen

Inventor.
Evan J. Morgan,
by DeWitt C. Allen,
Attorney.

UNITED STATES PATENT OFFICE.

EVAN J. MORGAN, OF MILWAUKEE, WISCONSIN.

IMPROVEMENT IN MILLSTONE-DRESSES.

Specification forming part of Letters Patent No. 186,150, dated January 9, 1877; application filed November 27, 1876.

*To all whom it may concern:*

Be it known that I, EVAN J. MORGAN, of Milwaukee, in the State of Wisconsin, have invented certain new and useful Improvements in Millstone-Dress for Reducing Wheat into Middlings; and I do hereby declare that the following is a full, clear, and exact description of the same, reference being made to the accompanying drawing, forming a part of this specification, and in which—

Figure 1:
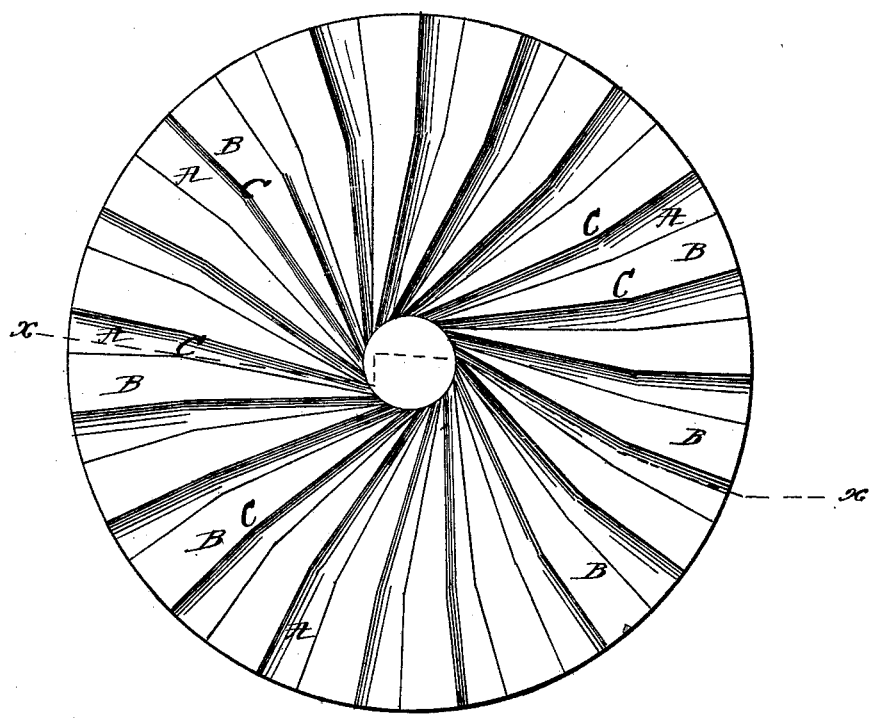
Figure 2:
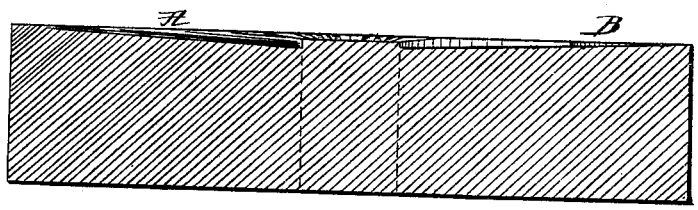

Figure 1 is a plan view; Fig. 2, a cross-section through the line $x\ x$ of Fig. 1.

It is well known to all persons familiar with the present system of grinding and converting wheat into flour that the principal object is to make all the middlings possible out of the wheat, and at the same time clean the bran, and produce a better grade of flour from the flour unavoidably made from the first grinding.

In most all of the dresses heretofore used the principal object has been to get the meal out from under the stones as soon as possible, so as not to grind the coarse particles or middlings into flour, and it was therefore deemed necessary to have as much draft as possible, by either having short furrows leading into the main furrows, which decreased the amount of grinding-surface, or having the main furrows with increasing draft from the eye to the skirt of the stone. These different dresses would make the meal uneven, and not clean the bran perfectly, for the reason that it had not sufficient grinding-surface to pass over to become equalized and clean. The meal would be cut up on the sharp edges of the furrows in the eye, where the stone had the least motion and the largest quantity of wheat compared with the grinding-surface, and when it arrived at or near the skirt of the stone, where the greatest motion exists, and the proper grinding should be done, it was carried out by these increasing drafts above referred to, and leave the stones with very little between them at that point. The stones would then have a tendency to swell, and, in order to prevent it, they would have to be set closer together, which destroyed the desired effect, and, consequently, a small per cent. of middlings would be produced from the wheat, and the flour unavoidably produced was soft and dark.

The object of my invention is to obviate all these difficulties by equalizing the draft with the motion and grinding-surface of the stone from the eye to the skirt thereof, so as to have an equal amount, or nearly so, of the material on all parts of the stone, thus enabling me to grind higher and produce more middlings, and at the same time clean the bran, while the small quantity of flour produced is white and sharp. This I accomplish by a millstone-dress commencing at the eye with a quick draft, and gradually decreasing to little or no draft at the skirt of the stone.

My invention therefore consists in having all the furrows leading-furrows, in which the furrows are made wide and shallow to and from a short distance from the skirt of the stone, and then gradually increasing in depth, but decreasing in width, to the eye of the stone, as will be hereinafter more fully described.

In the drawing, A represents the furrows, and B the lands or grinding-surface, of the stone. The furrows A are made wide and shallow from the skirt of the stone to the point C, as clearly shown in Fig. 1 of the drawing, or about eight inches from the skirt toward the eye, from which point the furrows gradually increase in depth, but decrease in width, to the eye of the stone.

It will be perceived that all the furrows being leading-furrows, or extending from the skirt to the eye of the stone, and being made wide and shallow from the skirt of the stone, and then gradually increasing in depth, but decreasing in width, to the eye of the stone, more land or grinding-surface is obtained, while the furrows have the same conducting capacity by increasing in depth to the eye of the stone. Increasing the quantity of land or grinding-surface without decreasing the conducting capacity is a very essential feature, as I am enabled to produce more middlings from the wheat, and also increase the grinding capacity of the stones.

It will also be perceived that in having all the furrows leading-furrows the draft is alike in them all, as the furrows all lead from the eye to the skirt of the stone.

Another important feature of my invention consists in having the furrows crooked or bent at the point C. This construction allows the material to be retained longer between the stones than it would if the furrows ran straight from the eye to the skirt of the stone.

I do not desire to limit myself to the number of furrows shown, as the nature of some stones requires more than others.

I claim as my invention—

1. A millstone-dress in which all the furrows extend from the eye to the skirt of the stone, the furrows made wide and shallow from the skirt, and then gradually increasing in depth and decreasing in width to the eye of the stone, substantially as herein shown and described.

2. A millstone-dress in which the furrows are made wide and shallow at the skirt, increasing in depth and decreasing in width to the eye of the stone, and having the bends or crooks, substantially as herein shown and described.

EVAN J. MORGAN.

Witnesses:
C. PAESCHKE,
L. MATTHES.